Aug. 18, 1942.  A. J. FISCHER  2,293,028
SEWAGE TREATMENT
Original Filed Nov. 20, 1937
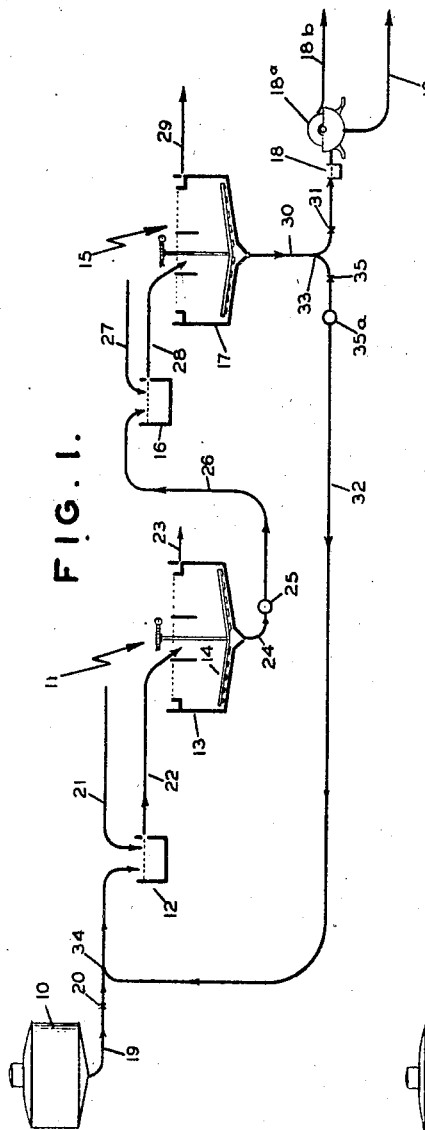
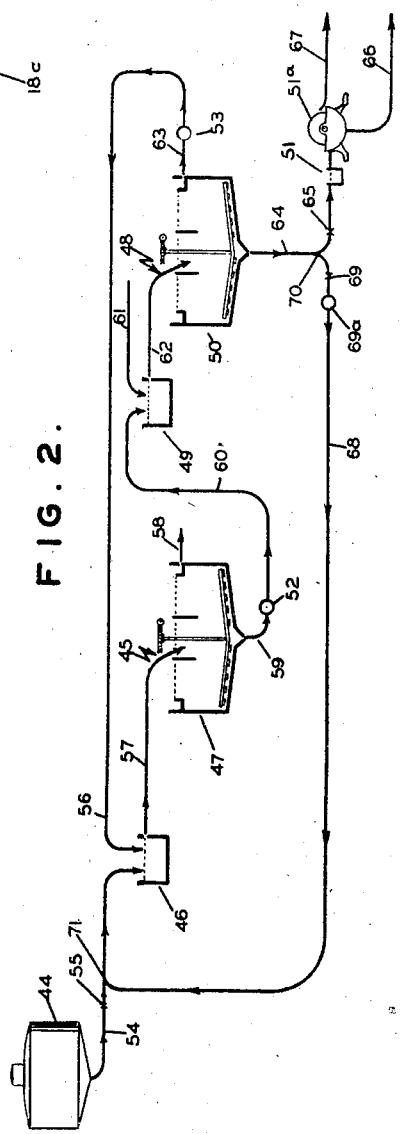
INVENTOR
Anthony J. Fischer
BY
Austin Middleton
ATTORNEY Patented Aug. 18, 1942

2,293,028

UNITED STATES PATENT OFFICE 2,293,028

SEWAGE TREATMENT

Anthony J. Fischer, Flushing, N. Y., assignor to The Dorr Company, Inc., New York, N. Y., a corporation of Delaware Continuation of application Serial No. 175,557, November 20, 1937. This application July 16, 1940, Serial No. 345,717

8 Claims. (Cl. 210—2)

This invention relates to the elutriation of sludges derived from polluted liquids such as sewage, trade-wastes and the like. It is an improvement over the sludge elutriation system or method of the U. S. Patent No. 1,999,973 to Albert L. Genter, dated April 30, 1935.

That patent teaches that the filtrability of such sludges is improved by washing therefrom with water, or sewage effluent, the ammoniacal content of the sludges; and possibly other substances that interfere with effective filtration.

The invention of that patent is feasible when carried out in a manner whereby the washed sludge is continuously filtered. But if the filters are operated intermittently or at intervals or during certain hours of the day when a filter attendant is available, there is a backing up or detaining and accumulating of the sludge in the decanting tank or tanks ahead of the filter to an extent and for a period long enough for the sludge (that is not thoroughly digested) to spoil either by going septic, or by digesting further and so forming more ammonia and other soluble compounds that have been previously washed out.

The tendency of sewage sludge to go septic upon its detention for any substantial period of time, or even brief periods of time, has been of constant concern to sanitary engineers; so it has been a real problem, which up to now has been solved by keeping all the sludge in motion progressively through the plant, whereby none of it was permitted to be retained long enough to go septic, for septicity is an ever-present danger. This fear by engineers attached itself to the treatment of all unstable sludges, such as raw, activated or even chemically-dosed sludge, or any combination thereof, prior to digestion. Digestion, of course, is a stabilizing treatment by which the previously-mentioned sludges are rendered innocuous.

Therefore, my basic contribution is the discovery that unstable sludges or sludges that are subject to biologic decomposition, can be retained or detained between the place of their deposition and the place of further treatment such as digestion, and their ultimate de-watering, for relatively long periods of time without detriment or harmful deterioration of the sludges. This is something that has never been attained before.

I have found that this end can be accomplished by washing from the sludges undesirable accumulations of products of biologic decomposition. This can be done with water or any other liquid available, because these products are, in the main, soluble.

However, the washing out of these products must be fairly uniform over the entire body of sludge being detained, because any undue concentration of these products in one portion of a body of sludge would be sufficient to set up septicity, which would quickly spread to the rest of the body.

Therefore, to bring about substantially uniform removal of the decomposition products from all parts of the sludge, applicant proposes to remove sludge from the detained body, mix it with washing water capable of dissolving the decomposition products, restoring the mixture to the detained body of sludge, and drawing off from the body supernatant liquid which contains decomposition products. In its simplest form, then, this invention involves the detaining of a body of sludge and keeping it in non-septic condition by continually removing therefrom the putrescent substances generated in it as a result of biological decomposition. These putrescent substances are removed from the body about as fast as formed, by means of water continually added to the body and continually removed therefrom.

In a sludge derived from organics such as sewage, it is normally and inherently inoculated with biologic organisms which include, for instance, bacterial flora. These organisms are immotile, and therefore, in order to keep the benevolent types active, while deterring activity of the non-benevolent types, it becomes important to see that those of the benevolent type (1) have food conveyed to them; and (2) have their excrescences removed from their vicinity.

The life cycle of these organisms is short; also they ingest all the time. The benevolent type excrete liquids that are putrescent to the organisms themselves and which, if they accumulate, stimulate activity of the non-benevolent organisms that bring about septic action.

So it has been found that by continually supplying water to and through the retained body of sludge, nutriment is conveyed to the benevolent organisms; their putrescent excrescences are washed from them; and being soluble by the water, these are removed from the detained body of sludge when the dater is decanted therefrom.

The present invention finds another important use, and that is in a sewage-treatment plant where it is made use of between the place of deposition of the sludge and a digester for that sludge. By accumulating sludge that, for the purposes of illustration we shall call "raw"

sludge, prior to its passage to a digester several important results can be attained. Heretofore the instability of the sludge required it to be passed to a digester substantially as fast as was deposited in the feed end of a sewage plant otherwise undue detention thereof leads to the development of objectionable characteristics, to wit, putrefaction, for the thus detained sludge. At the same time, digested sludge could not be removed from the digester under winter conditions or other conditions that were adverse to the subsequent de-watering of digested sludge. Therefore, a digester had to be designed so that its capacity was large enough not only to receive all of the sludge passed to it during the winter season, but sufficiently large to retain all of the resultant digested sludge produced during the winter months.

Other difficulties than merely storage capacity were encountered in such a system, because the biologic organisms used in a sewage-sludge digester are anaerobes that must have an environment that is on the alkaline side. On the other hand, and in opposition thereto, the unstable sludge that is to be digested has a preponderance of biologic organisms that are aerobes, and these prefer an acid environment.

Therefore, when unstable sludge that is acid and full of aerobes, is supplied to a digester that must make use of anaerobes that prefer an alkaline environment, there is always a preliminary battle that must be fought until the anaerobes predominate. This contributes to inefficiency of digestion. But if the unstable sludge, prior to being passed to the digester, is detained and accumulated in a decanting detention station, where there is continually washed from it the acid product of biologic decomposition, while septicity is avoided, the aerobes begin to diminish in quantity and the acidity of the detained sludge drops markedly. Therefore, the detained sludge is brought nearer the neutral point and it contains only enough active biologic organisms to keep it from septicity. If it is transferred in this condition to a digester, the digestion processes are then made more efficient, because a preliminary battle between anaerobes and aerobes is almost non-existent. Again, as the detention station or tank for the sludge is much cheaper to build and maintain per cubic foot of capacity within a digester, the installation cost of such a plant is less than that of the standard types.

It may be said, therefore, that this type of washing and decanting sludge-detention station comprises a pre-treatment zone of a digester because in it, rather than in the digester, the transition is made from the preponderance of the previously beneficial type of bacteria and acid environment to an almost neutral environment with a minimum of decomposition products of aerobes that are inimical to the anaerobes in a digester.

An object of this invention accordingly, is to avoid this unsatisfactory effect by maintaining the sludge in treatable condition at all times, irrespective of the length of time that the filter is inoperative.

This invention, more specifically may be said to reside in continuing to wash or elutriate the sludge in closed circuit, during the non-operation of the filter station or other station or stage of subsequent treatment of the sludge, or at least for such a part of the non-operation period thereof as is necessary to maintain the washed sludge in readily treatable condition. More particularly, the invention comprises closing off incoming sludge and closing off the exit of washed sludge from passing to the subsequent treatment stage while recycling the sludge already in the washing system through the decanting tanks or other washing stages to which stages washing water is continued to be fed and from which stages the effluent is continued to be passed. That is, this invention teaches the continued washing of the sludge even though it be detained during an interval when a subsequent treatment stage becomes inoperative, whereby the characteristics of the sludge in the washing system remain unchanged, or at least do not deteriorate.

Consequently some of the advantages inherent to the improved mode of sludge elutrition are: that undesirable chemical changes in the sludges or the formation of undesirable end products therein is avoided during periods of shut-down of subsequent treatment equipment; furthermore, that where such equipment, as for instance filters, is operated only part of the day, a proportionately smaller size of thickeners or decantation tanks is required as compared with practice where the washing and decanting operation is carried out during only that part of the day when this sludge is being filtered.

With respect to the treatment of sewage sludge in an elutriation station according to this invention, such treatment is herein considered to apply to various types of sludge among which are: raw sludge, septic undigested sludge, digested sludge, humus (trickling filter) sludge, chemically precipitated sludge; and any mixture of any of these sludges, such composite sludge herein being referred to as mixed sludge.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawing there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawing in which:

Fig. 1 is a flowsheet for sludge treatment with stagewise elutriation and concurrent flow of sludge and wash water.

Fig. 2 is a flowsheet for sludge treatment with stagewise elutriation and countercurrent flow of sludge and wash water.

By way of example the figures illustrating the present improvements comprise that part of a sewage treatment flowsheet which extends from a sewage settling tank or a sewage sludge digester to a stage of subsequent sludge treatment herein shown as a dewatering filter, a sludge elutriation assembly being interposed between the two.

In each of the figures there is illustrated a flow sheet according to which there is employed an elutriation system wherein during a long interruption or off period for operation usually performed subsequent to the elutriation, there can be realized or had an elutriating operation progressively effective on all of the sludge of organic solids held or detained in the elutriation system whereby no part of the sludge will remain without elutriation sufficient to prevent or avoid septicity thereof. In other words, according to the elutriation system of each of Figs. 1 and 2 all of the sludge therein can be and is recycled and elutriated in a manner sufficient to prevent it from substantial decomposition, or, as otherwise expressed, in a manner to maintain all of the sludge detained therein substantially in status quo as against septicity. Also in connection with the elutriation for each system it will be pointed out that suitable liquid for sludge elutriating purposes, to wit, fresh wash water is brought into the elutriation system during the operation thereof and that there is a co-temporary release therefrom of a corresponding quantity of effluent carrying therewith the washed-out products, namely, products which would otherwise accumulate and in a relatively short time create acid conditions leading to the initiating and establishing of objectionable septic conditions.

The flowsheet in Fig. 1 comprises a settling tank, thickener, or sludge storage tank, or a sewage sludge digester 10; a first elutriation stage 11 having a first re-diluting tank 12 and a decanting tank 13 shown to be provided with a rotary rake mechanism 14; a second elutriation stage 15 having a second re-diluting tank 16 and a second decanting tank 17; a conditioning tank 18 for addition of chemicals; and a filtering stage or continuous rotary filter 18a. If the conditioning tank 18 be omitted, the filter tank of filter 18a may be used as a mixing tank.

From the settling tank or the digester 10 sludge flows along path 19 having interposed in it a closure means or valve 20 (herein to be called the initial sludge valve), to the re-diluting tank 12 where wash water 21 is added. The sludge thus diluted continues along path 22 into the decanting tank 13 where it separates into overflowing effluent leaving the tank at 23 and settled solids sludge passing out by way of underflow 24. A pump 25 lifts the sludge from tank 13 along path 26 into the second re-diluting tank 16 where again it is mixed with wash water 27. This mixture of sludge and wash water continues along path 28 into the second clarifier tank 17 from which overflows effluent 29 while settled solids or sludge leaves the tank through a sludge line 30.

According to the arrangement of Fig. 1 the incoming liquor for washing the sludge is supplied to each of the elutriation stages, to wit, along lines 21 and 27 and outflow effluent with washed out products therein leaves from the respective decanting tanks, to wit, from the elutriating system or operation, along the lines 23 and 29.

This sludge line 30 has interposed in it a closure means or valve 31 (herein to be called the final sludge valve), through which it reaches the conditioning tank 18 where conditioning chemicals such as alum or ferric chloride are added before the conditioned sludge is sent to the continuous rotary filter 18a from which filtrate passes at 18c and sludge cake at 18b.

Whereas the flowsheet so far described may be considered as embodying a principle of operation disclosed in the above mentioned Genter Patent No. 1,999,973, nevertheless there is added according to the present invention a fundamentally novel feature according to which in case of stoppage or shut down of the filter 18a the sludge then present in the system is continued to be washed to prevent undesirable biological changes thereof. Accordingly then, the wash water supply is continued as the sludge is being recirculated through the elutriation stage or stages.

Consequently, there is provided a sludge return conduit 32 starting from the sludge line 30 at a point 33 ahead of the valve 31 and terminating in the line 19 at the point 34 past the valve 20. The return conduit 32 has in it a shut-off valve 35 or the like and a pump 35a.

The flowsheet in Fig. 2 is shown to include substantially the same basic elements as Fig. 1, although in a modified hook-up; that is to say, a settling tank or a digester 44; a first elutriation stage 45 having a first re-diluting tank 46 and a first decanting tank 47; a second re-diluting stage 48 having a second re-diluting tank 49 and a second decanting tank 50; a conditioning tank 51; a continuous rotary filter 51a; and a sludge pump 52 in the underflow line from tank 47. In addition to these elements, Fig. 2 includes a pump 53 for boosting clarifier effluent in counter-current washing as will be described.

From the settling tank or the digester 44 sludge flows along the path 54 having interposed in it a closure means or shut-off valve or initial sludge valve 55, into the first re-diluting tank 46 of the first elutriation stage 45, where it meets a supply of washing liquid 56 in the form of effluent coming from the second elutriation stage 48. From tank 46 the diluted sludge advancing along path 57 enters the decanting tank 47, to be separated into overflowing effluent 58 and settled solids or sludge passing from the tank along the line 59. The pump 52 then lifts the sludge along line 60 into the second re-diluting tank 49 where it meets a fresh water supply 61. From tank 49 the re-diluted sludge flows along line 62 into the second decanting tank 50 where it separates into effluent overflowing at 63, which effluent is boosted by pump 53 to furnish the aforementioned wash water supply 56 into the first re-diluting tank 46. Settled solids or sludge leaving the second decanting tank as underflow, pass along path 64 having a shut-off valve or final sludge valve 65, and reach the conditioning tank 51 where conditioning chemicals such as alum or ferric chloride are added before the sludge is sent to the continuous rotary filter 51a from which filtrate passes at 66 and sludge cake at 67.

A sludge return connection is shown at 68 having a shut-off valve 69 and a pump 69a. This return connection starts at a point 70 ahead of the final sludge valve 65 and it terminates at a point 71 past the initial sludge valve 55.

According to the arrangement of Fig. 2 all of the incoming liquor for washing the sludge is supplied along the line 61 to a locality immediately ahead of the last decanting tank and the effluent from the last decanting tank is backwardly passed as washing liquid along the line 63, 53 and 56 to a locality ahead of the first decanting tank of the elutriating system. Effluent with the washed out products contained therein is released from the first or initial decanting tank, and from the elutriating system through the pipe 58.

While the operation of the flowsheets in Figs. 1 and 2 is believed to be clear from the foregoing detailed description, it is pointed out (taking Fig. 1 for example), that during normal operation of the plant and of the sludge filter 18ª the initial sludge valve 20 and the final sludge valve 31 are open while the shut-off valve 35 in the return connection 32 is closed. While the filter needs constant attention when in operation, as a matter of practice and for reasons of relieving the attendant or saving in personnel cost, the filter is operated only for periods of time, and it is stopped, say, during hours of the night when the attendant is withdrawn. According to the invention, during periods of filter idleness, the initial sludge valve 20 and the final sludge valve 31 are closed and the shut-off valve 35 in the return connection 32 is opened. As the filter is shut off, the pump 35ª is started to cause sludge from the second elutriation stage 15 to recirculate to the first elutriation stage 11 as shown, while the wash water supplies 21 and/or 27 are kept going. As a result the sludge present in the elutriation assembly is continued to be washed in a closed cycle during the period of filter shut down, so as to cause undesirable, injurious or putrescent matter to be washed away, and keep the sludge from stagnating and forming and accumulating undesirable end products and in an otherwise healthy condition during the period of lay-over, and until filter operation is resumed. Consequently, when the filter is started up again the shut-off valve 35 is closed while the initial sludge valve 20 and the final valve are reopened.

Where sludge having decomposable organics therein, is held for appreciable lengths of time, it has a tendency to become acid and go septic. To go septic is to putrfy or to become putrid. This is the result of bacterial or biologic activity which results in the decomposition of organic solid matter with the consequent evolution of gas. When this takes place in sludge in a sedimentation apparatus such as a settler or clarifier, the gasification tends to upset the sedimentation processes. The reason is that the gas bubbles, in rising, have a flotation effect by clinging to suspended solids, and those solids that otherwise would settle, are buoyed up and caused to rise instead of sink, by the rising gas bubbles. Thus floating islands are formed in the clarifier.

This condition can spread so quickly that it is an ever present concern of a plant operator to watch for signs of septicity in his clarifiers in order to overcome it and prevent the upsetting of the clarifying action of the clarifiers. It is to prevent the initiation and spread of this detrimental condition, that this invention has as its object.

In many plants it is common practice to daily subject sewage to sedimentation and to convey the sludge to the dewatering step or instrumentality relatively promptly prior to substantial development of putrescent characteristics therein.

In some plants there have been employed serial elutriating operations between sedimentation and dewatering. In none of the plants has there been contemplated nor has there been provided for therein, any means for or by which all of the sedimented sludge could be stored or treated against becoming putrid because of the septicity producing organisms therein. Such plants therefore have required relatively continuous operations to avoid inactive sludge storage for otherwise the sludge has taken on objectionable characteristics. It is a desirable object to devise an arrangement according to which sewage treatment plants can function in the normal manner with no long off-periods; for example, for five days of the week, and to have a relatively long off-period with respect to its normal operation for the two-day week-end periods. The method hereof has been developed having in view the progressively treating of all the detained sludge during long storage off-periods therefor in a manner whereby putrescence will be avoided. The present invention therefore contemplates during such long off-periods in progressive elutriation of all the sludge and also the elimination in outgoing washing liquid end products realized, all of which leads to a condition favorable to the retention of stored sludge which would otherwise contain septical organisms that would lead to putrescence during the long storage period. Applicant considers the invention hereof is broadly applicable to the preserving of sludge against the formation of objectionable end products that interfere with filtration: to wit, the process may be viewed as holding sludge in substantially "status quo."

The application for this patent was filed as a continuation of and substitute for my application Serial No. 175,557, filed November 20, 1937, and which was still pending at the date upon which the application for this patent was filed.

I claim:

1. In treating decomposable sludge subjecting the sludge to a plural stage treatment in elutriating decanting tank means having the tanks in serial arrangement with each tank holding a body of diluted sludge favorable to the deposition as settled sludge, and passing settled sludge from the elutriating means to a dewatering means: a method characterized in that for periods of substantial extent during which no sludge is passed from the elutriating means to the dewatering means at least some parts of said periods are employed for cyclically treating and elutriating the sludges within the elutriating means by steps comprising (a) diluting sludge withdrawn from a preceding decanting tank and then supplying the diluted sludge to a succeeding tank; (b) diluting sludge withdrawn from the final decanting tank and supplying such diluted sludge to the initial decanting tank for thereby completing a cyclic transference for the sludge within the elutriating means; (c) supplying wash water as elutriating liquid for diluting the sludges while en route for delivery into the decanting tanks; and (d) releasing excess supernatant liquid from the elutriating means as effluent carrying biologically developed putrescent substances.

2. A system for treating and disposing of sludge derived from organically polluted liquids such as sewage, trade wastes, or the like, comprising in operative combination and arrangement an elutriating means and a sludge dewatering means; of which the elutriating means embodies a plurality of mechanically cleaned decanting tanks in serial arrangement, sludge diluting means for each decanting tank disposed functionally ahead of the tank to which it corresponds, means for delivering liquid to the elutriating means whereby liquid is available for diluting sludge passing to each of the sludge diluting means, means for delivering incoming sludge to be treated to the initial sludge diluting means, means for conducting settled sludge from a preceding decanting tank to the sludge diluting means of the succeeding decanting tank, means for conducting the diluted sludge from each diluting means to the decanting tank corresponding thereto, means for releasing as effluent supernatant tank liquid that would otherwise unduly accumulate in the elutriating means, means for selectively passing settled sludge from the final decanting tank to the sludge dewatering means, and means for selectively conducting settled sludge from the final decanting tank back and to the initial diluting means.

3. In the treatment of sewage, trade waste and analogous impure liquids, the method which comprises settling from the liquid a supply sludge of decomposable organics, transferring said supply sludge from its place of settling to an elutriating locality, supplying wash water to said locality and thereby diluting the sludge, settling out in a place of deposition by quiescent sedimentation the solids of the diluted sludge as deposited elutriated sludge whereby effluent liquid containing putrescent matter is separated from said elutriated sludge and passing from said locality a quantity of said effluent corresponding to that of the wash water supplied, and normally within a relatively short period of time and more particularly prior to the development of substantial septicity in the deposited elutriated sludge delivering the same to a sludge disposal station and thereat subjecting the elutriated sludge delivered thereto to a sludge disposal operation; said method being characterized in that from time to time there is an interim during which (a) further transfer of supply sludge to the elutriating locality is stopped, (b) substantial quantities of sludge are detained in the elutriating locality against normal delivery to the sludge disposal station, and (c) substantially all of the sludge thus detained is insured against development of septicity therein by a series of protective steps comprising cyclically but progressively passing the solids of the thus detained deposited elutriated sludge along a closed path leading from and ultimately back to its place of deposition, supplying wash water to the solids of the sludge in transit along said closed path so that the sludge is diluted and re-elutriated to avoid septicity of the detained sludge, and correspondingly releasing as effluent elutriate with separated putrescent matter therein, and settling the solids of the thus re-elutriated sludge as deposited elutriated sludge; which steps are carried out whereby to substantially protect the detained sludge against septicity up to the time of resuming the normal passing of elutriated sludge from the elutriating locality to the sludge disposal station, and in due time resuming a normal delivery of the elutriated sludge from the elutriating locality to the sludge disposal station and at the latter subjecting it to a sludge disposal operation.

4. In the treatment of sewage, trade waste and analogous impure liquids, the method comprising procuring therefrom decomposable organic solids as sedimented sludge providing what is here termed as supply sludge, transferring said supply sludge to establish and maintain a body thereof in a locality for elutriating the sludge, supplying wash water to a quantity of the sludge of said locality and employing it in diluting the sludge holding a quantity of resulting diluted sludge in a state of sufficient quiescence whereby solids therein settle to the bottom of said body as deposited elutriated sludge, releasing supernatant liquid from said held sludge as effluent whereby putrescent products in the effluent are separated from the diluted sludge and passing the effluent along a pathway leading from the elutriating locality, and normally within a relatively short period of time after its deposition—namely, prior to the development of substantial septicity therein—transferring the deposited elutriated-sludge from the elutriating locality along another pathway leading to a sludge disposal station and there subjecting it to a sludge disposal operation; and alternating with the method as above normally carried out and from time to time for a substantial interim (a) arresting the transfer of such supply sludge to the elutriating locality, (b) detaining substantial quantities of already transferred supply sludge within the elutriating locality and holding it against delivery to normal sludge disposal operation, and (c) protecting the detained sludge against septicity by an interim cyclic treatment comprising passing sedimented elutriated sludge from its place of deposition at the bottom of said body and returning it to said body from which it was settled, supplying the wash water for and thereby diluting the sludge while in cyclic transit from said place of deposition and back to said body whereby the solids in said recycled liquid settle as sedimented re-elutriated sludge, releasing effluent including putrescent products therein from said elutriating locality; and in due course at the end of said interim resuming the transfer of deposited elutriated sludge—including any deposited re-elutriated sludge—from the elutriating locality to the sludge disposal station and there subjecting the thus transferred sludge to a sludge disposal operation; said supply of wash water and release of effluent with washed out products therein being for the purpose of insuring the detained sludge against septicity during the interim.

5. The method of treating suspended decomposable organic solids derived from polluted liquid such as sewage, trade wastes and the like, comprising separating the suspended solids therefrom to form a supply sludge, normally transferring said sludge to a sedimentation station of the decanting type, normally settling suspended solids therein to form a body of sedimented sludge passing decanted liquid from said station along one pathway and normally passing the sedimented sludge along another pathway leading to a sludge disposal station and thereat subjecting it to an operation for dewatering the solids thereof; and under abnormal conditions shutting off transfer of supply sludge to said sedimentation station and detaining the sludge already in said station against passage to the sludge disposal station thus storing it in a locality providing in operative association along a cyclic pathway a sedimentation station of the decanting type and a diluting tank, cycling said sludge within and along said pathway during substantial portions of said storage, applying wash liquid to the solids of the sludge within and passing through the diluting tank for substantially diluting all of the thus detained sludge, meanwhile separating liquid as elutriate from the solids while the sludge thus elutriated is within the sedimentation station, releasing from the cyclic pathway decanted liquid as elutriate with washed-out products therein whereby putrescent matter thus washed out of the solids of the detained sludge is eliminated therefrom; said application of wash water and said release of elutriate being for the purpose of discouraging undue accumulations in the detained sludge of harmful products of progressive biologic decomposition.

6. In the handling and disposing of sludge derived from organically-polluted liquid such as sewage, trade waste and like, the method comprising normally flowing settled sludge to a diluting tank, normally supplying wash water to said tank and thereby diluting the sludge with water, normally flowing the diluted sludge to a decanting station having at least one decanting tank for holding the diluted sludge therein in a state of quiescence whereby solids of the diluted sludge gravitate as settled sludge, releasing along one path excess supernatant liquid from the decanting station, and normally passing the sludge from the decanting station along another path leading to a dewatering locality and there removing a relatively large quantity of liquid from the sludge to thereby thicken the sludge; which method is characterized in abnormally detaining the sludge against said transference from the decanting station to the dewatering station whereby the detained sludge is retained and stored within an elutriating station comprising in cyclic arrangement (a) at least one diluting tank wherein the thus detained sludge is diluted with wash water supplied to the elutriation station and (b) at least one decanting tank to which the diluted sludge is passed from a diluting tank and within which decanting tank the diluted sludge is held so as to provide a body of suspended solids in a state of quiescence favorable to the settling of solids thereof as elutriated sedimented sludge and from which decanting tank supernatant liquid passes as effluent bearing therein washed out putrescent products, and whereby such abnormally detained sludge is protected against development of objectionable septic conditions therein by a series of steps comprising (1) cyclically transferring substantially all of the sedimented sludge along a pathway leading from a lower portion of a quiescent liquid body within a tank of the decanting station and returning to a diluting tank and ultimately to an upper portion of the quiescent liquid body within a tank of said decanting station whereby a cyclic path is completed, (2) supplying wash liquid to the sludge in transit for elutriating the sludge of the diluting tank whereby no substantial quantity of the detained sludge is allowed to remain unre-elutriated and (3) releasing from the quiescent liquid body within any tank of said decanting station supernatant liquid as effluent having therein putrescent matter which has been washed out of the sludge by the re-elutriation of the settled sludge.

7. The procuring, handling and disposal of sludge derived from organically polluted liquid such as sewage, trade waste, or the like, according to a method comprising obtaining suspended solids therefrom in the form of sludge, flowing such sludge to elutriation station having in cyclic arrangement a diluting section and a decanting section for holding an ever-changing body of diluted sludge in a state of quiescence favorable to the settling of solids as deposited elutriated sludge, and from which supernatant liquid passes in quantities substantially according to the quantity of the supplied wash water hereinafter referred to, continuously supplying wash water to the sludge in the diluting section of the elutriation station for diluting the sludge therein and for washing from the solids of the sludge putrescent matter developed therein, flowing the diluted sludge to the decanting section and therein separating by quiescent settling the washed solids and the elutriate, collecting the washed solids as elutriated sludge sedimented on a settling area of the decanting section immediately underlying the region wherein the quiescent settling takes place, releasing supernatant liquid as effluent from the decanting station, and within a normal period of time prior to substantial development of septicity therein passing the sludge from the elutriation station to a dewatering station and at the latter removing a quantity of the liquid from the sludge and passing the separated-out liquid along a pathway leading from the left behind dewatered sludge; which method is characterized in that for certain abnormal periods herein referred to as abnormally long off-periods there is no feeding of sludge from its source to the elutriating station and there is no transfer of sludge from the elutriation station to the dewatering station but during such abnormally long off-periods at least some portion thereof is employed for repeated elutriation of sedimented sludge (a) by supplying wash liquid to the diluting tank of the elutriation station; (b) by cyclically passing substantial quantities of sedimented sludge along a closed path leading from the lower portion of decanting station back to a previous diluting tank and ultimately to the quiescent region within the decanting section; (c) by diluting the withdrawn sludge with the water supplied to the elutriating station; and (d) by returning the thus diluted withdrawn sludge to the quiescent region of the elutriation station and by settling the washed settled solids from the sludge within the quiescent region as sedimented re-elutriated sludge preparatory to a subsequent transfer of the sedimented re-elutriated sludge for dewatering of the solids thereof.

8. In the treatment of sewage, trade waste and analogous impure liquids, the method comprising settling from such liquids a sludge containing decomposable organics, and normally subjecting such sludge to a sludge-disposal operation prior to any substantial development of septic conditions therein; characterized by detaining substantial quantities of such settled sludge against normal delivery to the sludge-disposal operation for a detention period which is longer than that required for sedimentation purposes and which is for a period sufficiently long whereby septicity would normally set in and develop substantially, and insuring against development of septicity therein during such detention period by a treatment comprising the inflowing of wash liquor, intermixing such inflowing wash liquor and substantially all of the detained sludge to wash out putrescent matter therefrom for discouraging the formation therein of undesirable concentrations of putrescent matter, stratifying as elutriate liquid containing putrescent matter from the sludge, and outflowing as effluent stratified elutriate in quantity equal to the inflowing wash water; and ultimately resuming the normal delivery of deposited sludge to said sludge-disposal operation.

ANTHONY J. FISCHER.